US012498820B2

(12) United States Patent
Kadowaki et al.

(10) Patent No.: US 12,498,820 B2
(45) Date of Patent: Dec. 16, 2025

(54) METHOD, SENSOR CONTROLLER, AND ELECTRONIC APPARATUS

(71) Applicant: Wacom Co., Ltd., Saitama (JP)

(72) Inventors: Jun Kadowaki, Saitama (JP); Chengliang Hsieh, Taipei (TW); Chung-Nien Lang, Taipei (TW)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/507,467

(22) Filed: Oct. 21, 2021

(65) Prior Publication Data

US 2022/0164086 A1 May 26, 2022

(30) Foreign Application Priority Data

Nov. 25, 2020 (JP) ................... 2020-195590

(51) Int. Cl.
*G06F 3/041* (2006.01)
*G06F 3/0354* (2013.01)
*G06F 3/038* (2013.01)
*G06F 3/044* (2006.01)

(52) U.S. Cl.
CPC ...... *G06F 3/04166* (2019.05); *G06F 3/03546* (2013.01); *G06F 3/0383* (2013.01); *G06F 3/04162* (2019.05); *G06F 3/0441* (2019.05)

(58) Field of Classification Search
CPC ......... G06F 3/0442; G06F 2203/04108; G06F 3/04886; G06F 3/0383; G06F 3/04162; G06F 3/041; G06F 3/03545
See application file for complete search history.

(56) References Cited

U.S. PATENT DOCUMENTS

| | | | |
|---|---|---|---|
| 9,258,470 B1* | 2/2016 | Zhou | H04N 23/45 |
| 2004/0008387 A1* | 1/2004 | Ikeno | H04N 1/0402 |
| | | | 358/474 |
| 2010/0155153 A1* | 6/2010 | Zachut | G06F 3/04162 |
| | | | 178/18.03 |
| 2014/0078105 A1* | 3/2014 | Son | G06F 3/0418 |
| | | | 361/679.01 |

(Continued)

FOREIGN PATENT DOCUMENTS

| | | |
|---|---|---|
| JP | 2020-154482 A | 9/2020 |
| JP | 2022083939 A | 6/2022 |

*Primary Examiner* — William Boddie
*Assistant Examiner* — Alecia D English
(74) *Attorney, Agent, or Firm* — Seed Intellectual Property Law Group LLP

(57) ABSTRACT

A method performed by a sensor controller detects coordinates of a pen including one or more electrodes that transmit a signal. The method includes a first scanning step of performing an operation of detecting a signal transmitted from an electrode in contact with a panel surface at each of three or more first reference positions at which signal levels can be detected, from the signal detected in a sensor electrode group included in a first range, among plural juxtaposed reference positions. The method includes a second scanning step of performing an operation of detecting a signal transmitted from an electrode not in contact with the panel surface at each of three or more second reference positions at which signal levels can be detected, from the signal detected in a sensor electrode group included in a second range greater than the first range, among the plural reference positions.

11 Claims, 13 Drawing Sheets

(56) References Cited

U.S. PATENT DOCUMENTS

| | | | |
|---|---|---|---|
| 2015/0253927 A1* | 9/2015 | Noto | G06F 3/0446 |
| | | | 345/174 |
| 2016/0266686 A1* | 9/2016 | Kobori | G06F 3/04166 |
| 2016/0378212 A1* | 12/2016 | Kim | G06F 3/03545 |
| | | | 345/173 |
| 2017/0255282 A1* | 9/2017 | Winebrand | G06F 3/03545 |
| 2017/0262122 A1* | 9/2017 | Chang | G06F 3/0441 |
| 2017/0366804 A1* | 12/2017 | Du | H04N 23/633 |
| 2018/0129307 A1* | 5/2018 | Ju | G01L 5/0038 |
| 2018/0143703 A1* | 5/2018 | Fleck | G06F 3/038 |
| 2019/0163320 A1* | 5/2019 | Park | G06F 3/03545 |
| 2020/0159342 A1* | 5/2020 | Gray | G06F 3/04162 |
| 2020/0301548 A1 | 9/2020 | Onoda | |
| 2021/0373703 A1* | 12/2021 | Cho | G06F 3/0442 |

* cited by examiner

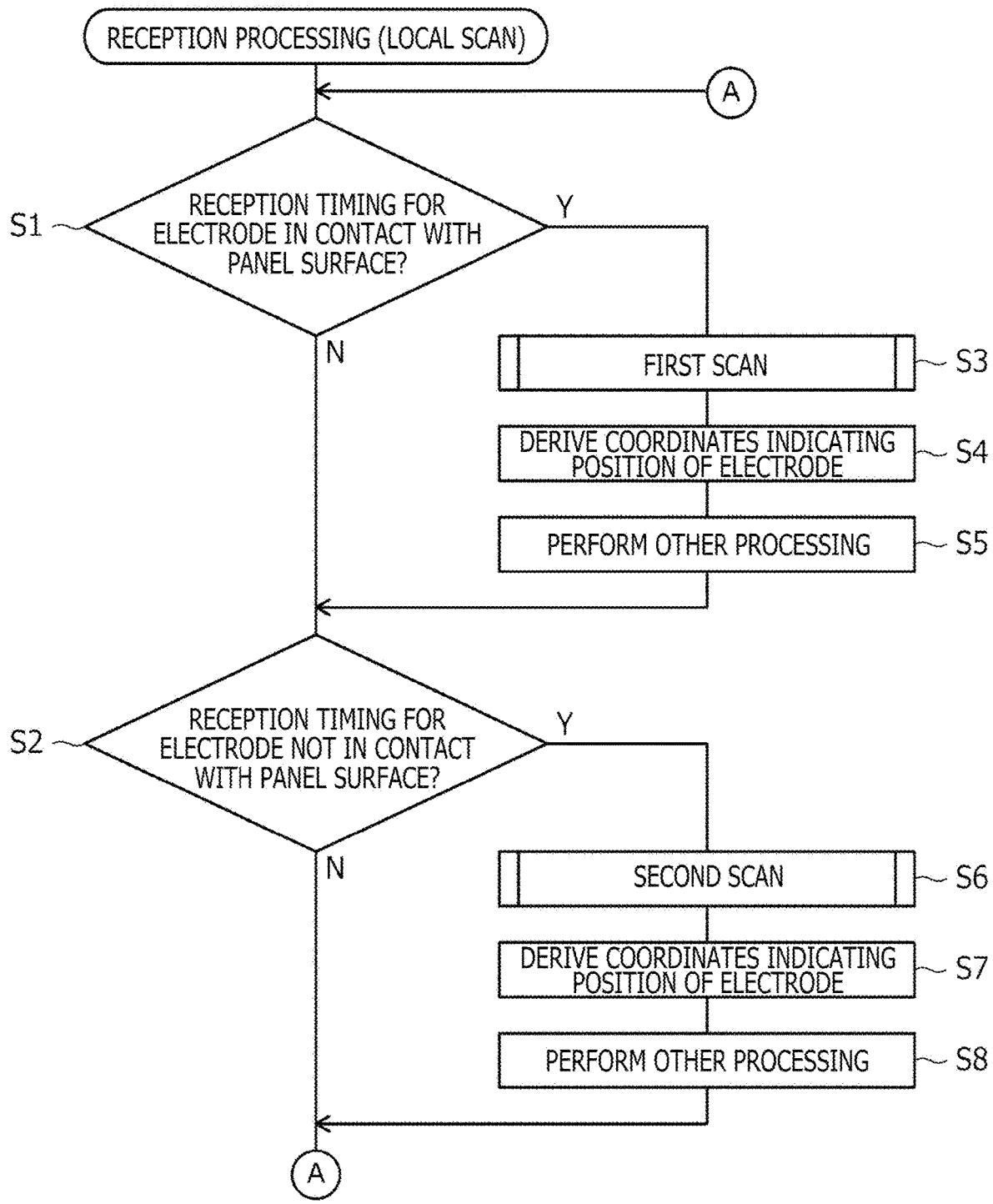

F I G. 6 A
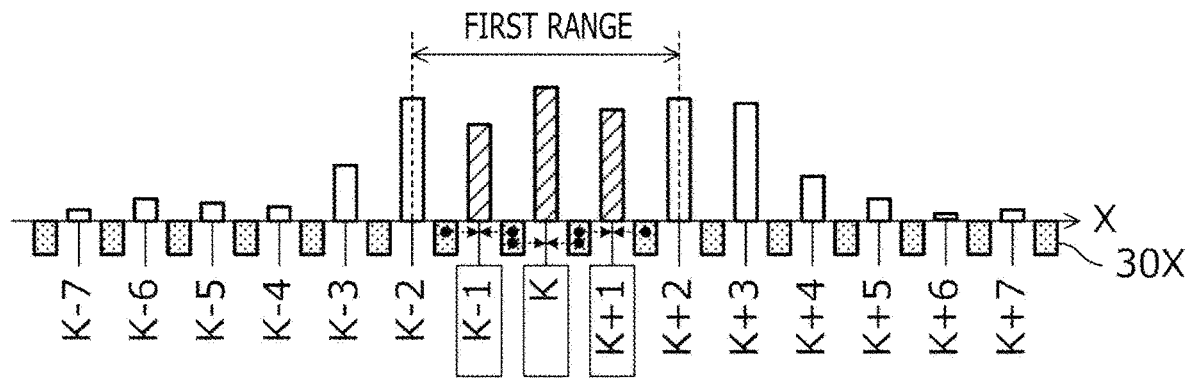
F I G. 6 B
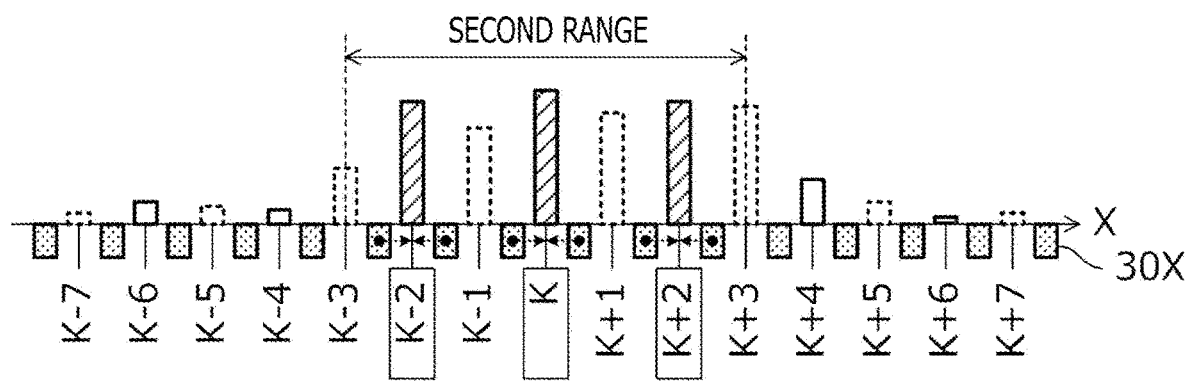
F I G. 6 C
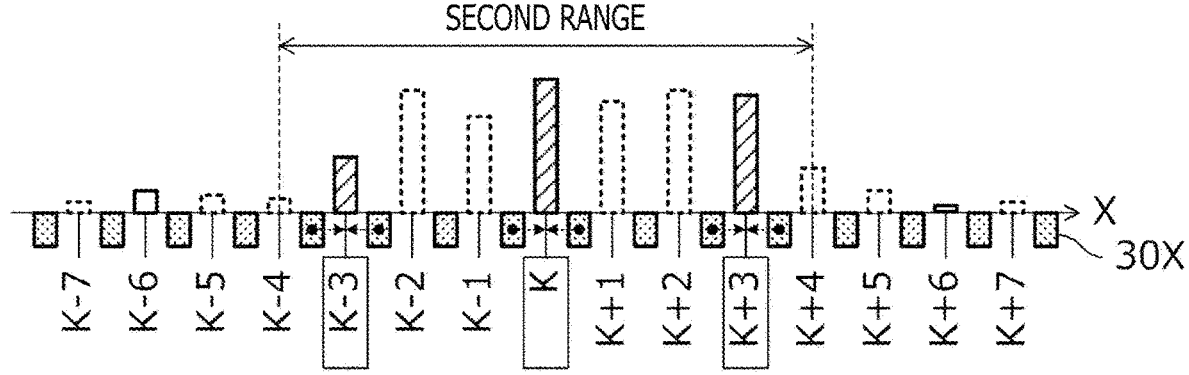

CORRESPONDING TO θ = 0°, X-DIRECTION, AND FIRST SCAN

CORRESPONDING TO θ = 0°, X-DIRECTION, AND
SECOND SCAN (EVERY OTHER REFERENCE POSITION)

CORRESPONDING TO θ = 0°, X-DIRECTION, AND
SECOND SCAN (EVERY THIRD REFERENCE POSITION)

CORRESPONDING TO θ = 0°, Y-DIRECTION, AND FIRST SCAN

CORRESPONDING TO θ = 0°, Y-DIRECTION, AND
SECOND SCAN (EVERY OTHER REFERENCE POSITION)

CORRESPONDING TO θ = 0°, Y-DIRECTION, AND
SECOND SCAN (EVERY THIRD REFERENCE POSITION)

CORRESPONDING TO θ = 30°, Y-DIRECTION, AND FIRST SCAN

CORRESPONDING TO θ = 30°, Y-DIRECTION, AND
SECOND SCAN (EVERY OTHER REFERENCE POSITION)

CORRESPONDING TO θ = 30°, Y-DIRECTION, AND
SECOND SCAN (EVERY THIRD REFERENCE POSITION)

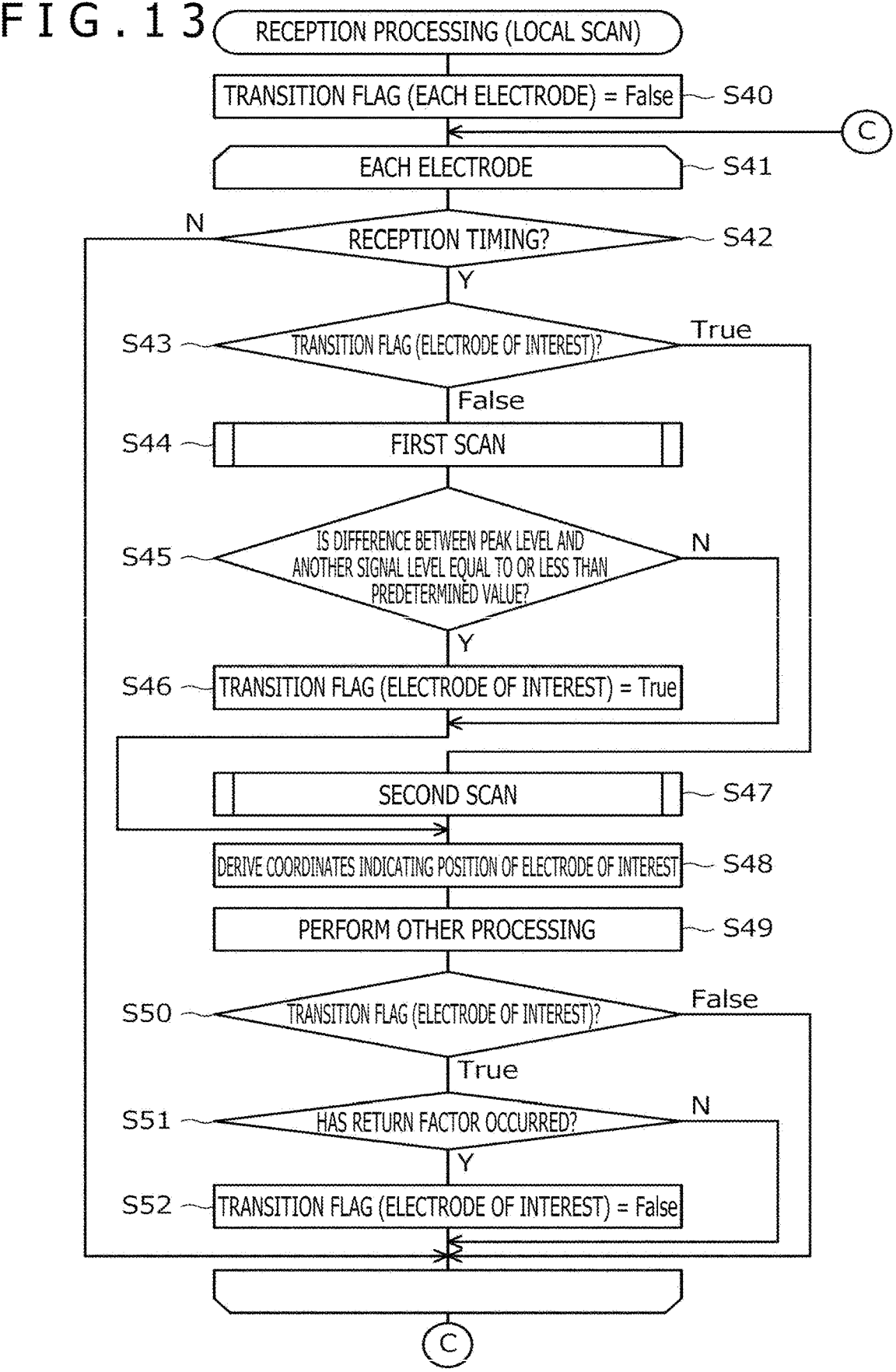

METHOD, SENSOR CONTROLLER, AND ELECTRONIC APPARATUS

BACKGROUND

Technical Field

The present disclosure relates to a method performed by a sensor controller that detects coordinates of a pen including an electrode that transmits a signal, the sensor controller, and an electronic apparatus including the sensor controller.

Description of the Related Art

A touch pad added to a notebook personal computer or the like is a kind of pointing device used to specify a position on a screen. A user can perform a mouse pointer operation by sliding a finger on a panel surface of the touch pad.

The touch pad has heretofore been used solely for input by a finger. In recent years, however, the use of the touch pad also for pen input has been investigated. Japanese Patent Laid-Open No. 2020-154482 discloses an example of a notebook personal computer that uses a touch pad also for pen input.

In a case where a pen input is performed on the touch pad, the panel surface needs to be associated with the entirety of the screen. Then, a result of the pen input performed on the panel surface is displayed in an enlarged state on the screen. Accordingly, in order that coordinate detection accuracy equal to that of a pen input on the screen may be obtained in a pen input on the touch pad, consideration has been given to making intervals of sensor electrodes, which are arranged under the panel surface (of the touch pad) to detect a position signal from a pen, closer than in a case where sensor electrodes are arranged under the screen. This provides an effect of improving accuracy of detection of coordinates of at least an electrode in contact with the panel surface (e.g., a pen tip electrode in contact with the panel surface or the like) among electrodes provided in the pen.

However, as a result of further studies by the inventors of the present application, it has been found that configuring the touch pad such that the arrangement intervals of the sensor electrodes are made closer may rather degrade the coordinate detection accuracy. Specifically, it has been found that accuracy of detection of the coordinates of an electrode not in contact with the panel surface (e.g., the pen tip electrode during hovering, a second electrode for tilt detection, or the like) may be degraded. This is considered to be attributable to a fact that the position signal transmitted by the pen may spread on the panel surface and thus a distinct peak cannot be obtained.

BRIEF SUMMARY

It is accordingly one aspect of the present disclosure to provide a method, a sensor controller, and an electronic apparatus that can achieve both an improvement in accuracy of detection of the coordinates of an electrode in contact with a panel surface and an improvement in accuracy of detection of the coordinates of an electrode not in contact with the panel surface.

A method according to the present disclosure is a method performed by a sensor controller for detecting coordinates of a pen including one or more electrodes configured to transmit a signal. The method includes a first scanning step of performing an operation of detecting a signal transmitted from an electrode in contact with a panel surface among the one or more electrodes at each of three or more first reference positions at which signal levels can be detected, from the signal detected in a sensor electrode group included in a first range, among a plurality of juxtaposed reference positions. The method includes a second scanning step of performing an operation of detecting a signal transmitted from an electrode not in contact with the panel surface among the one or more electrodes at each of three or more second reference positions at which signal levels can be detected, from the signal detected in a sensor electrode group included in a second range greater than the first range, among the plurality of reference positions. The method includes a first deriving step of deriving a coordinate on the basis of the signal levels of the signal detected in the first scanning step at the respective three or more first reference positions, and a second deriving step of deriving a coordinate on the basis of the signal levels of the signal detected in the second scanning step at the respective three or more second reference positions.

A sensor controller according to the present disclosure is a sensor controller for detecting coordinates of a pen including one or more electrodes configured to transmit a signal. The sensor controller performs a first scanning of performing an operation of detecting a signal transmitted from an electrode in contact with a panel surface among the one or more electrodes at each of three or more first reference positions at which signal levels can be detected, from the signal detected in a sensor electrode group included in a first range, among a plurality of juxtaposed reference positions. The sensor controller performs a second scanning of performing an operation of detecting a signal transmitted from an electrode not in contact with the panel surface among the one or more electrodes at each of three or more second reference positions at which signal levels can be detected, from the signal detected in a sensor electrode group included in a second range greater than the first range, among the plurality of reference positions. The sensor controller performs a first deriving of deriving a coordinate on the basis of the signal levels of the signal detected in the first scanning at the respective three or more first reference positions, and a second deriving of deriving a coordinate on the basis of the signal levels of the signal detected in the second scanning at the respective three or more second reference positions.

An electronic apparatus according to the present disclosure is an electronic apparatus including a pen and a sensor controller configured to detect coordinates of the pen. The pen includes one or more electrodes each configured to transmit a signal. The sensor controller performs a first scanning of performing an operation of detecting a signal transmitted from an electrode in contact with a panel surface among the one or more electrodes at each of three or more first reference positions at which signal levels can be detected, from the signal detected in a sensor electrode group included in a first range, among a plurality of juxtaposed reference positions. The sensor controller performs a second scanning of performing an operation of detecting a signal transmitted from an electrode not in contact with the panel surface among the one or more electrodes at each of three or more second reference positions at which signal levels can be detected, from the signal detected in a sensor electrode group included in a second range greater than the first range, among the plurality of reference positions. The sensor controller performs a first deriving of deriving a coordinate on the basis of the signal levels of the signal detected in the first scanning at the respective three or more first reference positions, and a second deriving of deriving a coordinate on the basis of the signal levels of the signal detected in the second scanning at the respective three or more second reference positions.

According to the present disclosure, the signal from the electrode not in contact with the panel surface can be captured in a greater range. It is therefore possible to achieve both an improvement in accuracy of detection of the coordinates of the electrode in contact with the panel surface and an improvement in accuracy of detection of the coordinates of the electrode not in contact with the panel surface.

BRIEF DESCRIPTION OF THE SEVERAL VIEWS OF THE DRAWINGS

FIG. 3 is a processing flowchart depicting reception processing of a downlink signal performed by a sensor controller at a time of a local scan;

FIG. 6A is a diagram explaining another example of the correspondence relation between the reference positions and the sensor electrodes, FIG. 6B is a diagram depicting a first example of the reference positions selected in step S17 in FIG. 4B in a case where the correspondence relation between the reference positions and the sensor electrodes is the correspondence relation depicted in FIG. 6A, and FIG. 6C is a diagram depicting a second example of the reference positions selected in step S17 in FIG. 4B in the case where the correspondence relation between the reference positions and the sensor electrodes is the correspondence relation depicted in FIG. 6A;

FIG. 13 is a processing flowchart depicting reception processing of the downlink signal performed by a sensor controller according to a modification of the embodiment of the present disclosure at a time of a local scan.

DETAILED DESCRIPTION

An embodiment of the present disclosure will hereinafter be described in detail with reference to the accompanying drawings.

Figure 1:
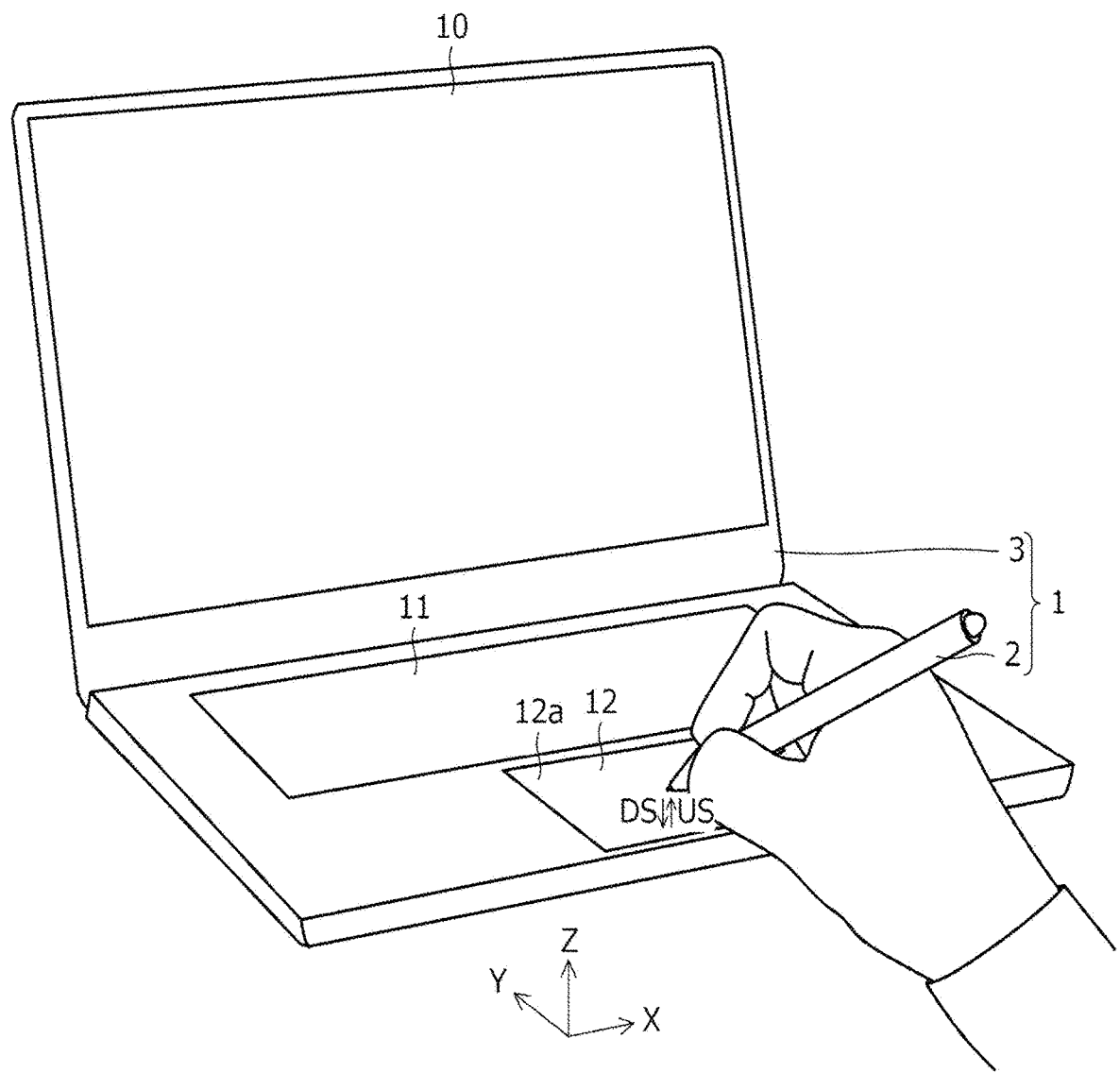
FIG. 1 is a diagram depicting a usage state of an electronic apparatus according to an embodiment of the present disclosure.

FIG. 1 is a diagram depicting a usage state of an electronic apparatus 1 according to the embodiment of the present disclosure. As depicted in the figure, the electronic apparatus 1 includes a pen 2 and a computer 3.

The pen 2 is a position indicator that inputs positional information to the computer 3. The pen 2 is used by a user to indicate a position on a panel surface 12a of a touch pad 12. The position indicated by the pen 2 becomes an input to the computer 3.

The computer 3 is a notebook personal computer. The computer 3 includes a display 10, a keyboard 11, and the touch pad 12. The display 10 is, for example, a display device having a display screen such as a liquid crystal display or an organic electroluminescent (EL) display. The display 10 plays a role of visually outputting text and drawings.

The keyboard 11 and the touch pad 12 are each an input device for the user to perform input to the computer 3. Of these, the touch pad 12 functions as an input device by detecting the position of a finger or the pen 2 on the panel surface 12a and outputting the position to a host processor 32 (see FIG. 2) to be described later. In the following description, a horizontal direction of the panel surface 12a as viewed from the user will be referred to as an X-direction, a depth direction will be referred to as a Y-direction, and a direction orthogonal to the X-direction and the Y-direction will be referred to as a Z-direction.

The detection of the position of a finger by the touch pad 12 is performed on the basis of a capacitive system, for example. The detection of the pen 2 is performed on the basis of an active capacitive system, for example. In the following, description will be continued assuming this active capacitive system. However, the present disclosure is applicable also in cases where the detection of the pen 2 is performed on the basis of another system such as an electromagnetic induction system.

The pen 2 supporting the active capacitive system is configured to transmit and receive signals bidirectionally to and from the touch pad 12 through built-in electrodes (a front end electrode 21 and a rear end electrode 22 depicted in FIG. 2 to be described later). In the following, a signal transmitted from the touch pad 12 to the pen 2 will be referred to as an uplink signal US, and a signal transmitted from the pen 2 to the touch pad 12 will be referred to as a downlink signal DS.

The touch pad 12 also has a function of detecting a click operation. Specifically, the click operation may be detected by detecting a tap operation on a touch surface using a pressure sensor not depicted (e.g., a pressure pad). Or, using a push-button switch disposed on the lower side of the panel surface 12a, the click operation may be detected when the user depresses the panel surface 12a, which itself is displaced downward to depress the push-button switch (e.g., a click pad). Further alternatively, a click button may be separately provided in the vicinity of the panel surface 12a, and the click operation may be detected on the basis of a depression of the button.

Figure 2:
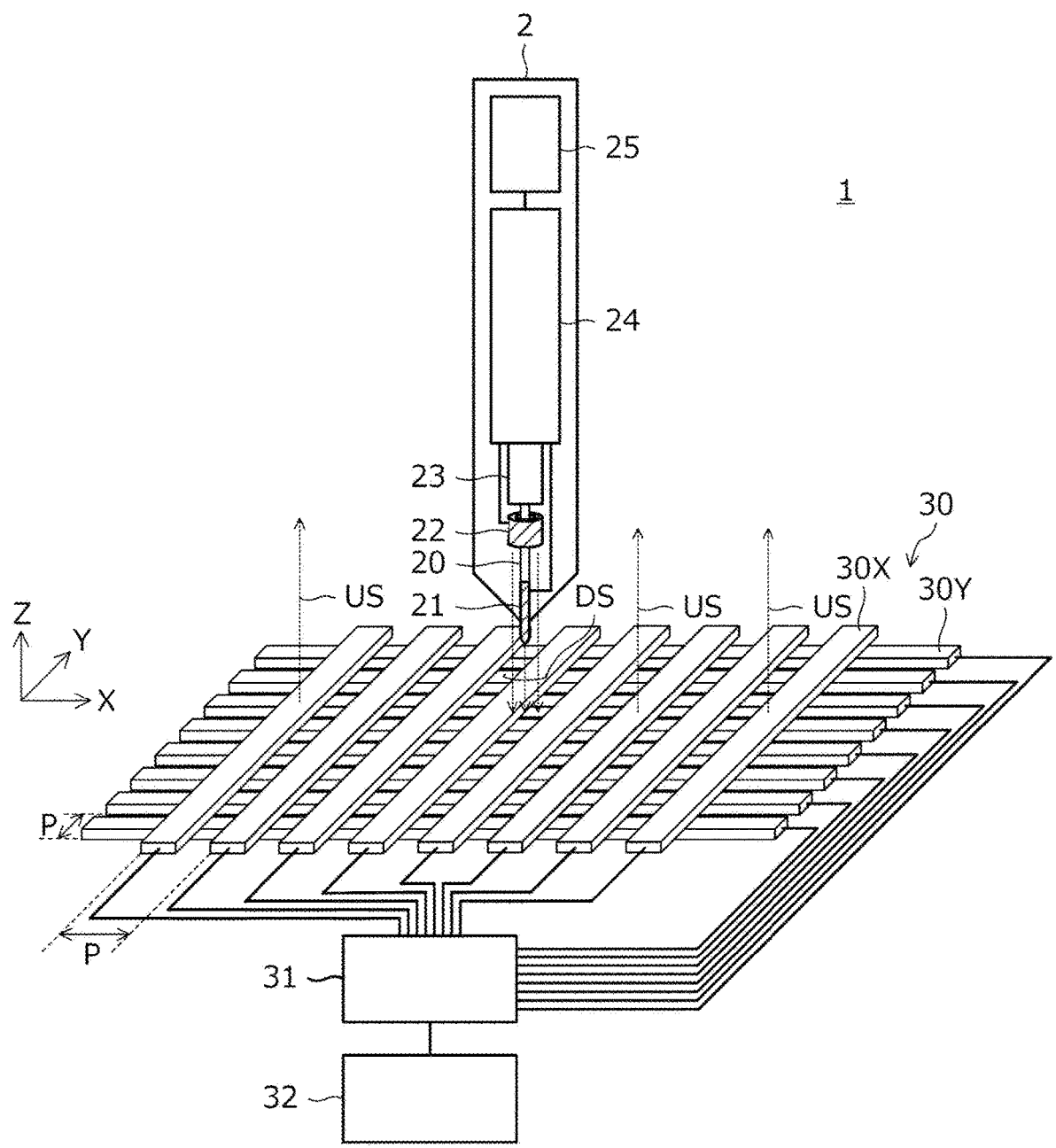
FIG. 2 is a diagram depicting respective internal configurations of a pen and a computer.

FIG. 2 is a diagram depicting respective internal configurations of the pen 2 and the computer 3. However, as for the internal configuration of the computer 3, only a part related to detection of the position of the pen 2 is depicted.

Directing attention first to the pen 2, as depicted in FIG. 2, the pen 2 includes a core (central rod) 20, a front end electrode 21, a rear end electrode 22, a pen pressure detecting sensor 23, a circuit unit 24, and a power supply 25. A cylindrical AAAA battery, for example, is used as the power supply 25.

The core 20 is a rod-shaped member disposed such that the longitudinal direction of the rod-shaped member coincides with the pen axis direction of the pen 2. The surface of a front (distal) end portion of the core 20 is coated with a conductive material to constitute the front end electrode 21 (pen tip electrode). The front end electrode 21 does not necessarily need to be disposed on the surface of the frontmost end portion of the core 20. In this case, a state may occur in which the frontmost end portion of the core 20 is in contact with the panel surface 12a but the front end electrode 21 is not in contact with the panel surface 12a. However, the description of "front end electrode 21 (being) in contact" in the present embodiment encompasses the front end electrode 21 in such a state.

A rear end portion of the core 20 abuts against the pen pressure detecting sensor 23. The pen pressure detecting sensor 23 plays a role of detecting a pressure (pen pressure) applied to the front end of the core 20. The rear end electrode 22 (a second electrode for tilt detection) is provided in the rear end portion of the core 20 (at a position toward/on the rear end side relative to the front end electrode 21 in the pen 2). The rear end electrode 22 may be a ring-shaped (doughnut-shaped) conductor. The rear end electrode 22 is disposed such that the core 20 passes through a hole in the center of the rear end electrode 22.

The circuit unit 24 has a function of receiving an uplink signal US transmitted from the panel surface 12a of the touch pad 12 via the front end electrode 21 and a function of transmitting a downlink signal DS to the panel surface 12a of the touch pad 12 via the front end electrode 21 or the rear end electrode 22. These signals will be described later in detail.

Directing attention next to the computer 3, the computer 3 includes a sensor 30, a sensor controller 31, and a host processor 32 depicted in FIG. 2. Of these, the sensor 30 and the sensor controller 31 are elements that constitute the touch pad 12, and the host processor 32 is a central processing unit of the computer 3.

The sensor 30 is a touch sensor embedded under the panel surface 12a. The sensor 30 includes pluralities of sensor electrodes 30X and 30Y that may be capacitively coupled to each of the front end electrode 21 and the rear end electrode 22. Of these, the plurality of sensor electrodes 30X each extend in the Y-direction and are juxtaposed at a fixed pitch P in the X-direction. The plurality of sensor electrodes 30Y each extend in the X-direction and are juxtaposed at a fixed pitch P in the Y-direction. As depicted in FIG. 2, the plurality of sensor electrodes 30X and the plurality of sensor electrodes 30Y are arranged so as to be superposed on each other in the Z-direction. While the sensor electrodes 30X and 30Y are illustrated to be plate-shaped conductors in FIG. 2, actual sensor electrodes 30X and 30Y may be conductors in another shape or configuration, such as mesh conductors.

The pitch P is set to be a value smaller than the pitch of sensor electrodes embedded under a screen in a tablet terminal or the like supporting pen input on the screen (which pitch will hereinafter be referred to as an "conventional pitch"). In a typical example, the pitch P is approximately a third of the conventional pitch. This enables the touch pad 12 to detect the coordinates of the front end electrode 21 in contact with the panel surface 12a with higher accuracy than in a case where the sensor electrodes 30X and 30Y are arranged at the conventional pitch.

The sensor controller 31 is an integrated circuit that performs various kinds of processing to be described later by reading and executing a program stored in a built-in memory. The sensor controller 31 is configured to have a function of receiving a downlink signal DS transmitted by the pen 2 via the sensor 30 and a function of transmitting an uplink signal US to the pen 2 via the sensor 30. As depicted in FIG. 2, the sensor controller 31 is connected to each of the pluralities of sensor electrodes 30X and 30Y, respectively.

The uplink signal US is a signal including an instruction (command) to the pen 2 and having a role of notifying the pen 2 of a start time of a schedule set by a signal transmission and reception protocol. The sensor controller 31 is configured to transmit the uplink signal US by using at least either the plurality of sensor electrodes 30X or the plurality of sensor electrodes 30Y. The pen 2 is configured to receive the uplink signal US by using the front end electrode 21. The pen 2 after receiving the uplink signal US performs an operation according to the command included in the uplink signal US.

The command transmitted by the uplink signal US includes, for example, a command specifying the signal transmission and reception protocol used for signal transmission and reception to and from the pen 2, a command specifying data to be transmitted to the sensor controller 31 by the pen 2 (which data will hereinafter be referred to as "pen data"), and the like. The pen data includes a value indicating a pen pressure detected by the pen pressure detecting sensor 23. The pen 2 that has received the command specifying the signal transmission and reception protocol thereafter performs reception of the uplink signal US and transmission of the downlink signal DS, according to the schedule determined by the specified signal transmission and reception protocol and the start time of the schedule that is notified by the uplink signal US.

The downlink signal DS includes a downlink signal DS transmitted from the front end electrode 21 and a downlink signal DS transmitted from the rear end electrode 22. The former downlink signal DS includes a position signal for making the sensor controller 31 detect the position of the front end electrode 21 and a data signal for transmitting the pen data. The position signal is, for example, an unmodulated carrier signal (burst signal). The data signal is a carrier signal modulated by the pen data to be transmitted. The latter downlink signal DS includes a position signal for making the sensor controller 31 detect the position of the rear end electrode 22. The position signal may also be an unmodulated carrier signal (burst signal), for example.

The downlink signal DS transmitted from the front end electrode 21 and the downlink signal DS transmitted from the rear end electrode 22 are transmitted in a multiplexed manner such that the sensor controller 31 can distinguish and receive these signals. While various kinds of multiplexing methods such as time division multiplexing, frequency division multiplexing, and code division multiplexing can be used as a multiplexing method, the following description will be continued assuming that time division multiplexing is used.

The sensor controller 31 is configured to, at a timing of receiving the downlink signal DS transmitted from the front end electrode 21, detect coordinates indicating the position of the front end electrode 21 within the panel surface 12a by receiving the position signal, and obtain the pen data transmitted by the pen 2 by receiving the data signal. On the other hand, the sensor controller 31 is configured to, at a timing of receiving the downlink signal DS transmitted from the rear end electrode 22, detect coordinates indicating the position of the rear end electrode 22 within the panel surface 12a by receiving the position signal, thereafter derive a distance between the coordinates indicating the position of the rear end electrode 22 and the coordinates indicating the position of the front end electrode 21 that has been previously detected, and derive a tilt of the pen 2 on the basis of the results. The sensor controller 31 is configured to supply the host processor 32 with the thus detected coordinates, the obtained pen data, and the derived tilt on an as-needed basis.

Concrete contents of processing performed by the sensor controller 31 using the uplink signal US and the downlink signal DS differ according to whether or not the sensor controller 31 is already paired with the pen 2. Processing performed by the sensor controller 31 in a case where the sensor controller 31 is not yet paired with the pen 2 will hereinafter be referred to as a "global scan." Processing performed by the sensor controller 31 in a case where the sensor controller 31 is already paired with the pen 2 will hereinafter be referred to as a "local scan." An outline of each scan will be described in the following.

When the global scan is to be performed, the sensor controller 31 transmits, to an unpaired pen 2 as a destination, the uplink signal US including a command giving an instruction to transmit only a position signal from the front end electrode 21. After transmitting the uplink signal US, the sensor controller 31 detects the position signal by scanning all of the sensor electrodes 30X and 30Y constituting the sensor 30 in turn. After thus detecting the position signal, the sensor controller 31 derives the coordinates of the front end electrode 21 on the basis of the detected position signal and is set in a state of being paired with the pen 2.

When the local scan is to be performed, the sensor controller 31 transmits, to an already paired pen 2 as a destination, the uplink signal US including a command giving an instruction to transmit a position signal and a data signal from the front end electrode 21 in turn, and next to transmit a position signal from the rear end electrode 22. Thereafter, the sensor controller 31 first detects the position signal transmitted from the front end electrode 21 by selecting predetermined numbers of sensor electrodes 30X and 30Y located in the vicinity of a previously derived position of the front end electrode 21 from among the pluralities of sensor electrodes 30X and 30Y, and scanning the selected sensor electrodes 30X and 30Y in turn. After thus detecting the position signal, the sensor controller 31 derives the coordinates of the front end electrode 21 on the basis of the detected position signal and outputs the coordinates of the front end electrode 21 as coordinates of the pen 2 to the host processor 32.

Next, the sensor controller 31 detects the data signal transmitted from the front end electrode 21 by selecting one sensor electrode 30X or one sensor electrode 30Y closest to the position of the front end electrode 21 that is previously derived the previous time or this time from among the pluralities of sensor electrodes 30X and 30Y, and scanning the selected sensor electrode 30X or the selected sensor electrode 30Y. After thus detecting the data signal, the sensor controller 31 obtains pen data transmitted by the pen 2 by demodulating the detected data signal.

Finally, the sensor controller 31 detects the position signal transmitted from the rear end electrode 22 by selecting predetermined numbers of sensor electrodes 30X and 30Y located in the vicinity of a previously derived position of the rear end electrode 22 (or the position of the front end electrode 21 that is derived the previous time or this time) from among the pluralities of sensor electrodes 30X and 30Y, and scanning the selected sensor electrodes 30X and 30Y in turn. After thus detecting the position signal, the sensor controller 31 derives the coordinates of the rear end electrode 22 on the basis of the detected position signal. Then, the sensor controller 31 derives the tilt of the pen 2 on the basis of the derived coordinates of the front end electrode 21 and the newly derived coordinates of the rear end electrode 22 and outputs the tilt of the pen 2 to the host processor 32.

The host processor 32 is a processing device that executes an operation system of the computer 3 and various applications by reading and executing a program stored in a storage device, not depicted. The applications executed by the host processor 32 include a drawing application. The drawing application generates stroke data based on the coordinates, the pen data (including a value indicating a pen pressure), and the tilt supplied from the sensor controller 31, and renders and displays the stroke data on the display 10 depicted in FIG. 1. In addition, the drawing application performs processing of generating digital ink data including the generated stroke data, storing the digital ink data in the storage device, not depicted, and transmitting the digital ink data to another computer.

Basic configurations of the pen 2 and the computer 3 and basic processing performed by the pen 2 and the sensor controller 31 have been described above. Description will next be made in detail of processing performed by the sensor controller 31 to achieve both an improvement in accuracy of detection of the coordinates of the electrode in contact with the panel surface and an improvement in accuracy of detection of the coordinates of the electrode not in contact with the panel surface.

FIG. 3 is a processing flowchart depicting reception processing of the downlink signal DS performed by the sensor controller 31 at a time of a local scan. As depicted in the figure, the sensor controller 31 performs processing that differs between reception timing for the electrode in contact with the panel surface 12a and reception timing for the electrode not in contact with the panel surface 12a. The "electrode in contact with the panel surface 12a" referred to here is, for example, the front end electrode 21 in contact. The "electrode not in contact with the panel surface 12a" is, for example, the rear end electrode 22 or the front end electrode 21 during hovering. Processing related to these concrete examples will be described in detail with reference to FIG. 8 below.

As depicted in FIG. 3, the sensor controller 31 first determines whether or not reception timing for the electrode in contact with the panel surface 12*a* has arrived (step S1). Then, the sensor controller 31 performs a first scan when determining that the reception timing has arrived (step S3). When the sensor controller 31 determines that the reception timing has not arrived, on the other hand, the sensor controller 31 further determines whether or not reception timing for the electrode not in contact with the panel surface 12*a* has arrived (step S2). The sensor controller 31 when determining in step S2 that the reception timing has arrived performs a second scan (step S6). The sensor controller 31 when determining in step S2 that the reception timing has not arrived returns to step S1 and continues the processing.

Figure 4A:
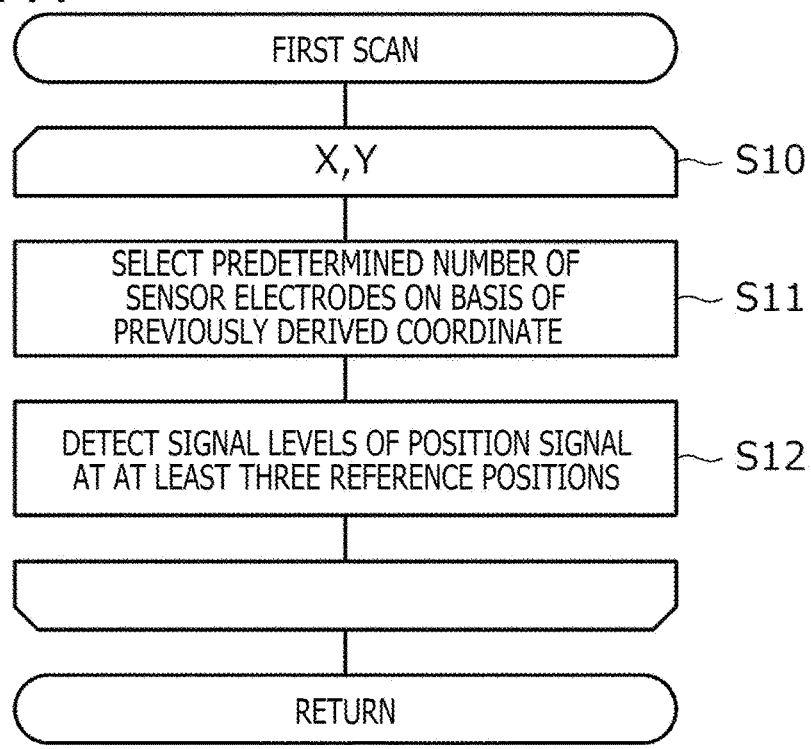
FIG. 4A is a processing flowchart depicting details of a first scan performed in step S3 in FIG. 3.

FIG. 4A is a processing flowchart depicting details of the first scan performed in step S3. As depicted in the figure, the sensor controller 31 that has started the first scan performs the processing of steps S11 and S12 for each of the X-direction and the Y-direction (step S10). While the processing of steps S11 and S12 will be concretely described in the following with attention directed to the processing for the X-direction, the same applies to the processing for the Y-direction.

The sensor controller 31 first selects a predetermined number of sensor electrodes 30X included in a predetermined range from a previously derived coordinate (hereinafter referred to as a "first range") (step S11). Next, the sensor controller 31 selects at least three or more reference positions (first reference positions) at which signal levels can be detected, from the position signal detected in the selected sensor electrodes 30X, and detects the signal levels of the position signals at the respective selected reference positions (step S12).

Here, the reference positions are positions at which to detect signal levels of the position signals and are juxtaposed at equal intervals on an X-axis (on a Y-axis in the processing for the Y-direction). In step S12, the sensor controller 31 is configured to select three or more reference positions arranged consecutively among reference positions, according to the previously derived coordinate. More specifically, the sensor controller 31 selects three or more reference positions in increasing order of distance from the previously derived coordinate. The reference positions are each associated with one or more sensor electrodes 30X in advance. In a case where there is one sensor electrode 30X that corresponds to the reference position, the signal level of the position signal at the sensor electrode 30X becomes the signal level of the position signal at the reference position in step S12. In a case where there are two or more sensor electrodes 30X that correspond to the reference position, the signal level of the position signal at the reference position in step S12 is obtained by statistically processing the signal levels of the position signals in these (two or more) sensor electrodes 30X. Concrete contents of the statistical processing may, for example, be a simple average, or may be a weighted addition performed by multiplying the signal levels by a weight determined on the basis of a distance from the reference position to each sensor electrode 30X. The first range is a range including all of sensor electrodes 30X necessary for the processing of step S12 to obtain the signal level of the position signal at each reference position.

Figure 5A:
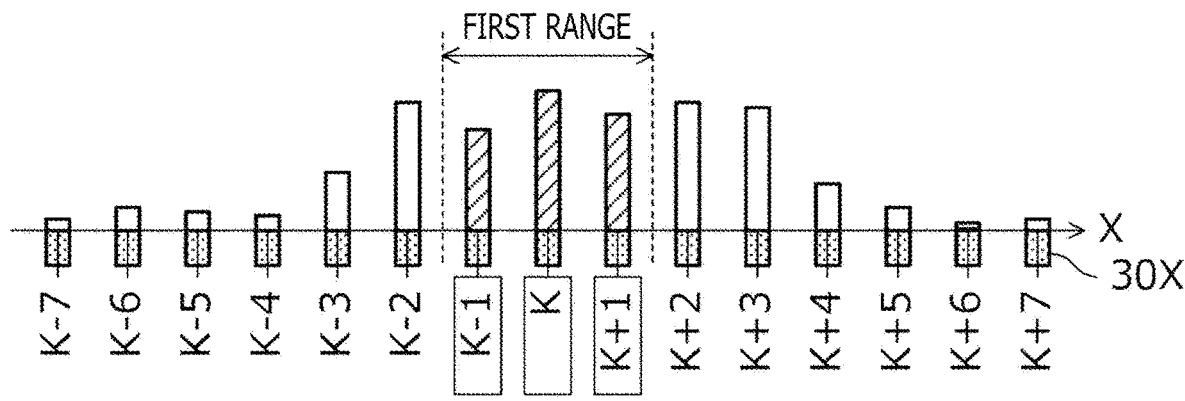
FIG. 5A is a diagram explaining an example of a correspondence relation between reference positions and sensor electrodes.
Figure 7A:
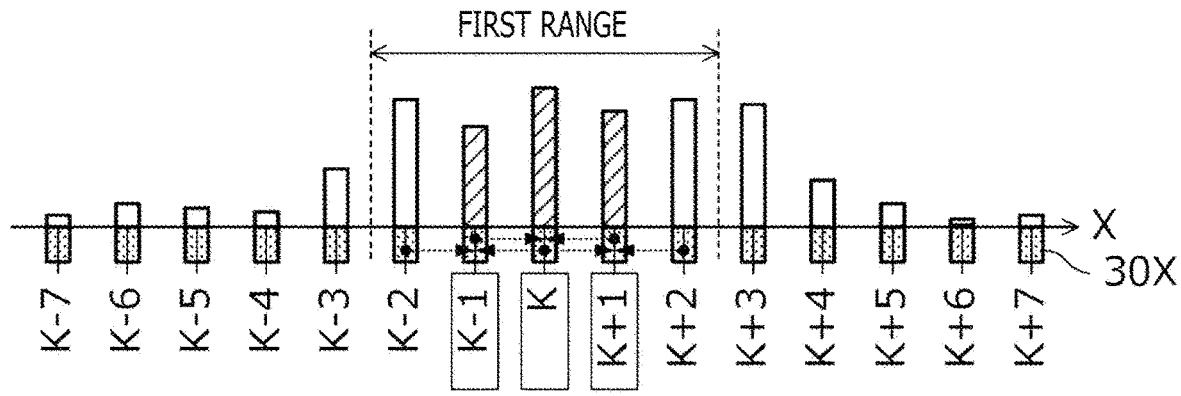
FIG. 7A is a diagram explaining still another example of the correspondence relation between the reference positions and the sensor electrodes.

FIG. 5A, FIG. 6A, and FIG. 7A are each a diagram explaining an example of correspondence relation between reference positions and sensor electrodes 30X. In these figures, X-coordinates K−7 to K+7 each represent a reference position. In addition, the X-coordinate K represents a reference position closest to a previously derived X-coordinate. Further, reference positions at which corresponding X-coordinates are enclosed by a rectangle represent the reference positions selected in step S12. In addition, a bar graph depicted on the upper side of the X-axis represents the signal levels of the position signals at the respective reference positions. Rightwardly upward hatching added to the bar graph indicates that the signal levels are actually detected in step S12.

FIG. 5A illustrates an example in a case where the number of sensor electrodes 30X corresponding to each reference position is one. In this case, each reference position is a central position in the X-direction of the corresponding sensor electrode 30X. In addition, the signal level of the position signal in the corresponding sensor electrode 30X is used as the signal level of the position signal at each reference position.

FIG. 6A illustrates an example in a case where the number of sensor electrodes 30X corresponding to each reference position is two. In this case, each reference position is an intermediate position in the X-direction between the two corresponding sensor electrodes 30X. In addition, an average value of the signal levels of the position signals in the two corresponding sensor electrodes 30X is used as the signal level of the position signal at each reference position.

FIG. 7A illustrates an example in a case where the number of sensor electrodes 30X corresponding to each reference position is three. In this case, each reference position is a central position in the X-direction of a sensor electrode 30X located at a center among the three corresponding sensor electrodes 30X. In addition, a value obtained by statistically processing the signal levels of the position signals in the three corresponding sensor electrodes 30X is used as the signal level of the position signal at each reference position.

The description returns to FIG. 3. The sensor controller 31 after ending step S3 derives coordinates indicating the position of the electrode in contact with the panel surface 12*a* on the basis of the levels of the position signals at the respective reference positions which are detected in the first scan (step S4). It suffices to perform this derivation by obtaining an approximate curve (quadratic function) of the detected signal levels by a least-square method and deriving the coordinates of a vertex of the approximate curve. After step S4, the sensor controller 31 performs other processing (step S5), and then moves the processing to step S2. Concrete contents of the other processing performed in step S5 will be described later with reference to FIG. 8.

Figure 4B:
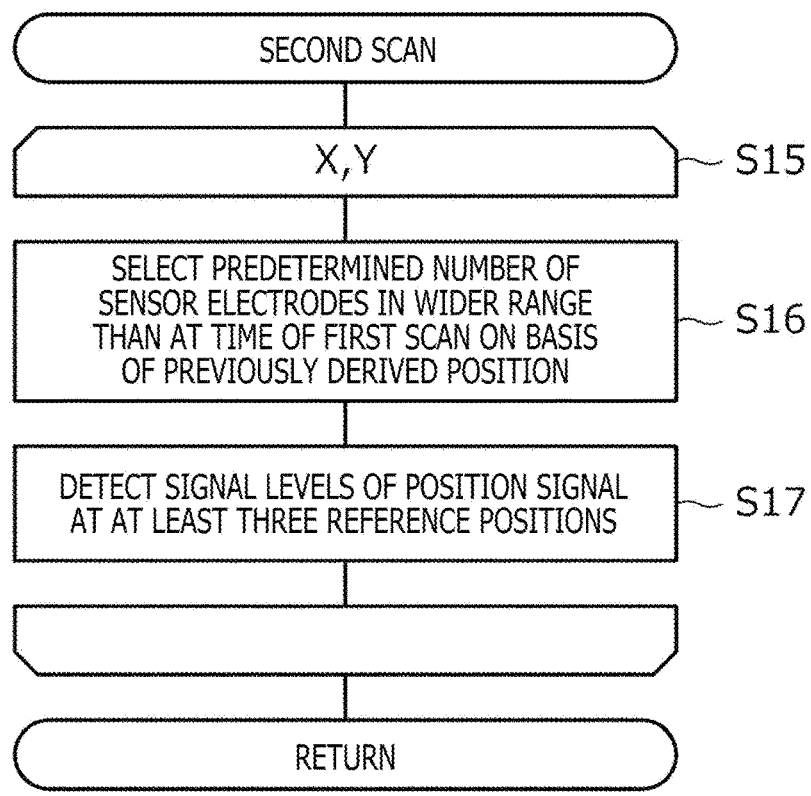
FIG. 4B is a processing flowchart depicting details of a second scan performed in step S6 in FIG. 3.

FIG. 4B is a processing flowchart depicting details of the second scan performed in step S6. As depicted in the figure, the sensor controller 31 that has started the second scan performs the processing of steps S16 and S17 for each of the X-direction and the Y-direction (step S15). While the processing of steps S16 and S17 will be concretely described in the following with attention directed to the processing for the X-direction, the same applies to the processing for the Y-direction.

The sensor controller 31 first selects a predetermined number of sensor electrodes 30X included in a predetermined range (hereinafter referred to as a "second range") from a previously derived coordinate (step S16). The second range is set to be a greater range than the range used at the time of the first scan. The sensor controller 31 next selects at least three or more reference positions (second reference positions) at which signal levels can be detected, from the position signal detected in the selected sensor electrodes 30X, and detects the signal levels of the position signals at the respective selected reference positions (step S17). The sensor controller 31 is configured to select, at this time, three or more reference positions non-consecutively (discretely or distributedly) arranged among a plurality of juxtaposed reference positions, according to the previously derived coordinate. More specifically, the sensor controller 31 is configured to select a reference position closest to the previously derived coordinate and two or more reference positions each arranged at an interval of a predetermined number of reference positions from the closest reference position.

Figure 5B:
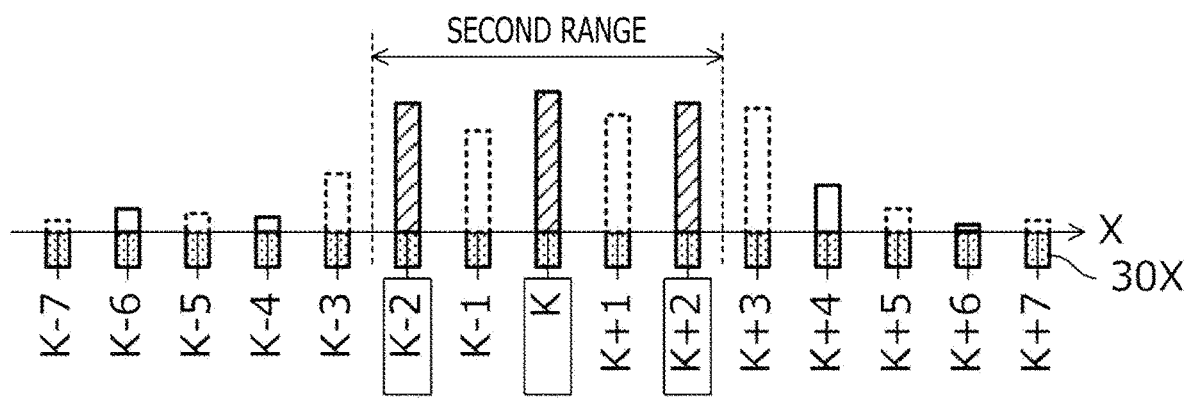
FIG. 5B is a diagram depicting a first example of reference positions selected in step S17 in FIG. 4B in a case where the correspondence relation between the reference positions and the sensor electrodes is the correspondence relation depicted in FIG. 5A.
Figure 7B:
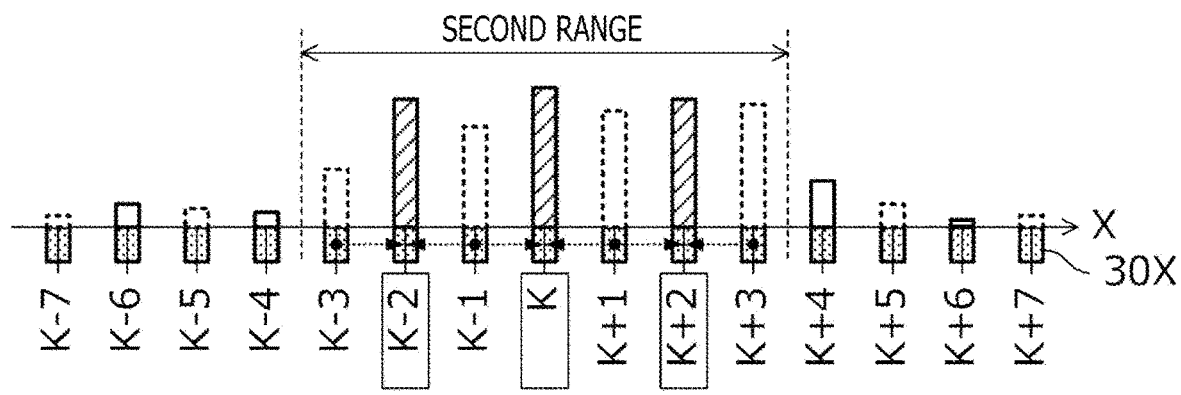
FIG. 7B is a diagram depicting a first example of the reference positions selected in step S17 in FIG. 4B in a case where the correspondence relation between the reference positions and the sensor electrodes is the correspondence relation depicted in FIG. 7A.

FIG. 5B, FIG. 6B, and FIG. 7B are diagrams depicting a first example of the reference positions selected in step S17 in cases where correspondence relations between the reference positions and the sensor electrodes 30X are the correspondence relations depicted in FIG. 5A, FIG. 6A, and FIG. 7A, respectively. The sensor controller 31 according to the present example is configured to select every other reference position. As a result, a second range greater than the first range becomes necessary. In addition, the span of the three or more reference positions (a span between both ends) selected by the sensor controller 31 according to the present example is greater than the span of the three or more reference positions (a span between both ends) selected by the sensor controller 31 in the corresponding first scan.

Figure 5C:
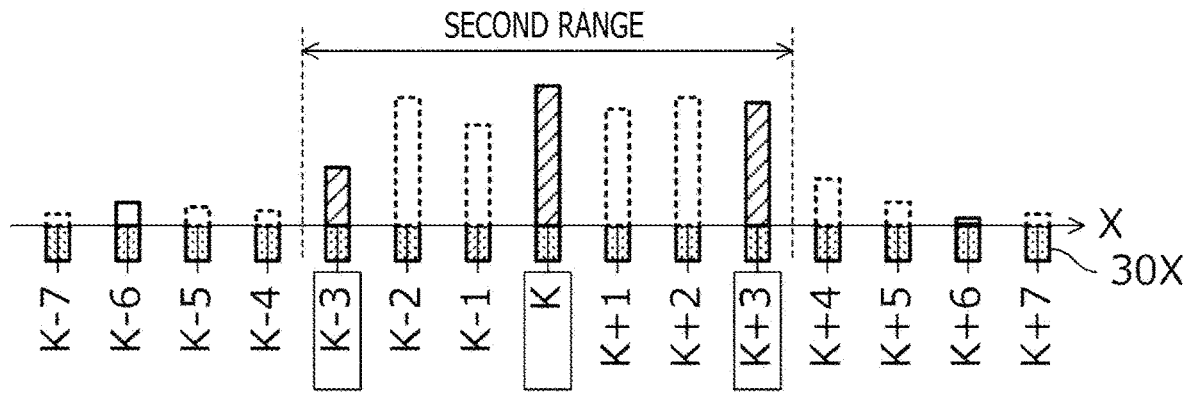
FIG. 5C is a diagram depicting a second example of the reference positions selected in step S17 in FIG. 4B in the case where the correspondence relation between the reference positions and the sensor electrodes is the correspondence relation depicted in FIG. 5A.
Figure 7C:
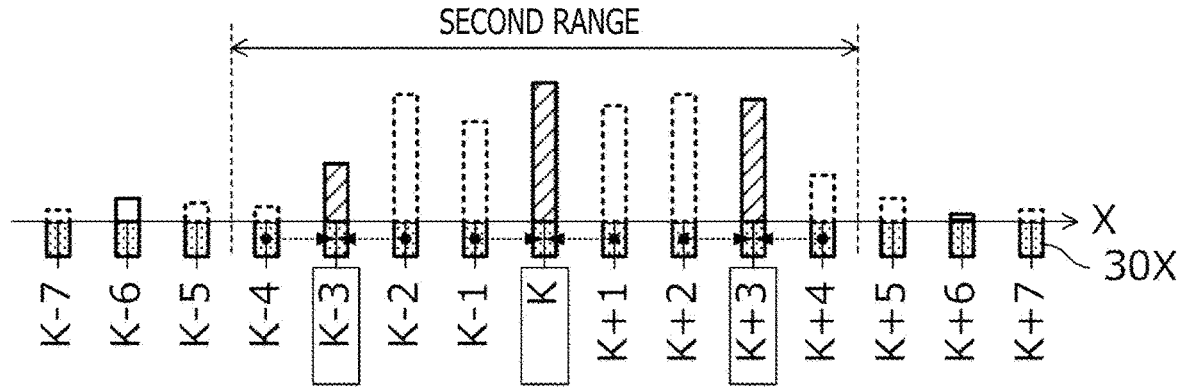
FIG. 7C is a diagram depicting a second example of the reference positions selected in step S17 in FIG. 4B in the case where the correspondence relation between the reference positions and the sensor electrodes is the correspondence relation depicted in FIG. 7A.

FIG. 5C, FIG. 6C, and FIG. 7C are diagrams depicting a second example of the reference positions selected in step S17 in cases where correspondence relations between the reference positions and the sensor electrodes 30X are the correspondence relations depicted in FIG. 5A, FIG. 6A, and FIG. 7A, respectively. The sensor controller 31 according to the present example is configured to select every third reference position. As a result, a second range even greater than the second range according to the first example becomes necessary. In addition, the span of the three or more reference positions (a span between both ends) selected by the sensor controller 31 according to the present example is even greater than the span of the three or more reference positions (a span between both ends) selected by the sensor controller 31 in the first example.

The description returns to FIG. 3. The sensor controller 31 after ending step S6 derives coordinates indicating the position of the electrode not in contact with the panel surface 12a on the basis of the levels of the position signals at the respective reference positions which are detected in the second scan (step S7). As in step S4, it suffices to perform this derivation by obtaining an approximate curve (quadratic function) of the detected signal levels by a least-square method and deriving the coordinates of a vertex of the approximate curve. After step S7, the sensor controller 31 performs other processing (step S8), and then moves the processing to step S1. Concrete contents of the other processing performed in step S8 will also be described later with reference to FIG. 8.

Figure 8:
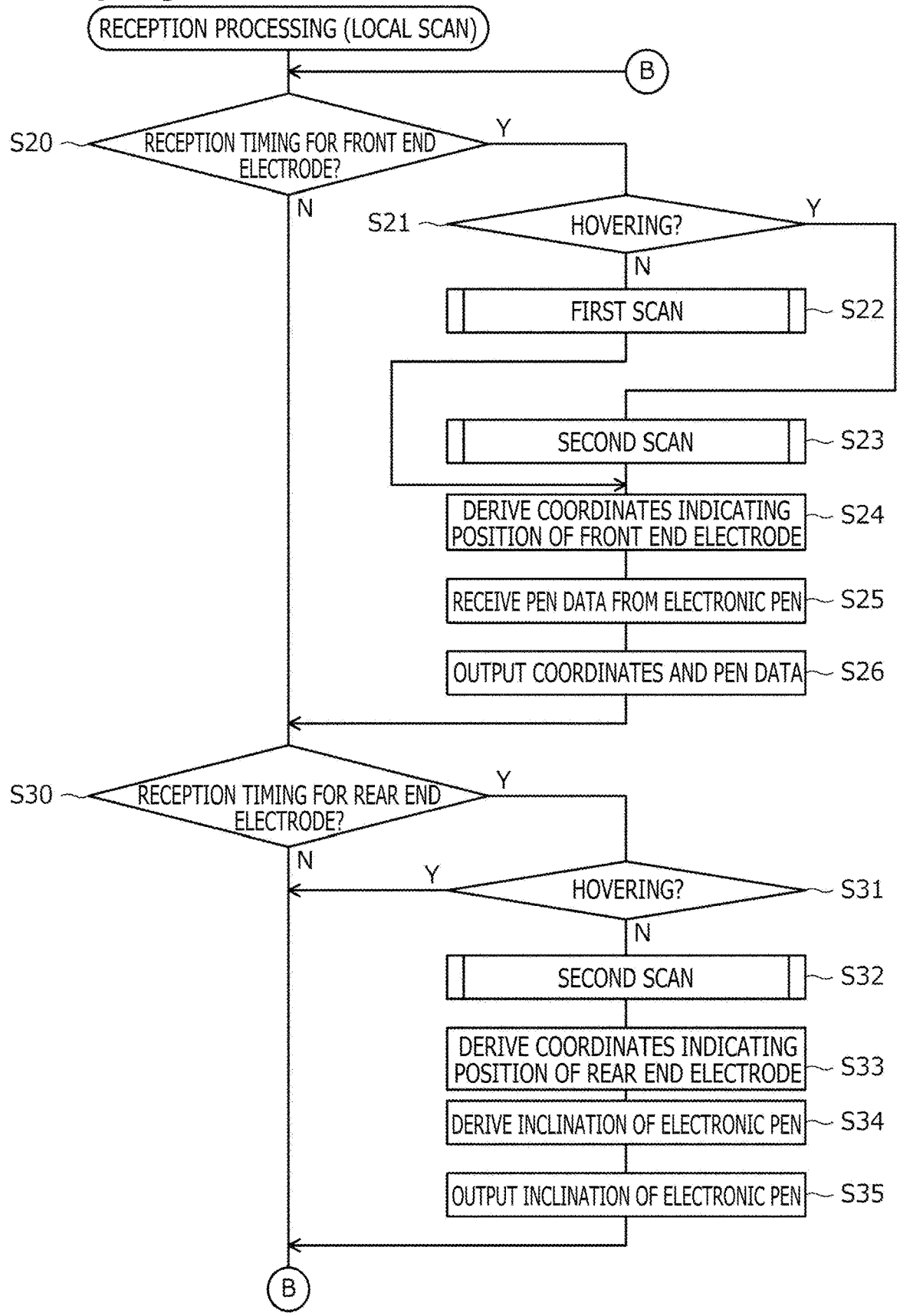
FIG. 8 is a processing flowchart illustrating the reception processing depicted in FIG. 3 using a more specific example.

FIG. 8 is a processing flowchart illustrating the reception processing depicted in FIG. 3 by a more concrete example. In the following, with reference to the drawing, reception processing of the downlink signal DS performed by the sensor controller 31 at a time of a local scan will be described according to the more concrete example.

The sensor controller 31 first determines whether or not reception timing for the front end electrode 21 has arrived (step S20). Then, when the sensor controller 31 determines that the reception timing for the front end electrode 21 has arrived, the sensor controller 31 next determines whether or not the pen 2 is hovering (step S21). Specifically, the sensor controller 31 determines that the pen 2 is hovering when the value of the pen pressure included in the pen data received from the pen 2 in the previous local scan is zero. Otherwise, the sensor controller 31 determines that the pen 2 is not hovering (that is, the pen 2 is in contact).

Here, the pen 2 may include contact/hover information indicating whether or not the pen 2 is hovering in the pen data. The sensor controller 31 in this case may determine whether or not the pen 2 is hovering on the basis of this contact/hover information. In addition, the sensor controller 31 may determine whether or not the pen 2 is hovering on the basis of the data (a value of the pen pressure or the contact/hover information) received from the pen 2 via a short-range radio communication such as Bluetooth (registered trademark).

The sensor controller 31 when determining in step S21 that the pen 2 is not hovering performs the processing of step S22. Step S22 is processing corresponding to step S3 in FIG. 3. In step S22, the sensor controller 31 performs the first scan, and obtains the signal levels of the position signals at the respective reference positions as a result of the first scan. On the other hand, the sensor controller 31 when determining in step S21 that the pen 2 is hovering performs step S23. Step S23 is processing corresponding to step S6 in FIG. 3. In step S23, the sensor controller 31 performs the second scan, and obtains the signal levels of the position signals at the respective reference positions as a result of the second scan.

The sensor controller 31 after ending step S22 or step S23 performs the processing of steps S24 to S26. Step S24 is processing corresponding to step S4 or step S7 in FIG. 3. In step S24, the sensor controller 31 derives coordinates indicating the position of the front end electrode 21 on the basis of the signal levels obtained in step S22 or step S23. Steps S25 and S26 are processing corresponding to step S5 or step S8 in FIG. 3. The sensor controller 31 receives pen data transmitted by the pen 2 by receiving the above-described data signal (step S25) and outputs the pen data to the host processor 32 together with the coordinates derived in step S24 (step S26).

The sensor controller 31 when determining in step S20 that the reception timing for the front end electrode 21 has not arrived determines whether or not reception timing for the rear end electrode 22 has arrived (step S30). The sensor controller 31 when determining here that the reception timing for the rear end electrode 22 has not arrived returns to step S20 and continues the processing. On the other hand, the sensor controller 31 when determining that the reception timing for the rear end electrode 22 has arrived determines whether or not the pen 2 is hovering (step S31). A concrete method of this determination may be similar to that of step S21. The sensor controller 31 when determining in step S31 that the pen 2 is hovering returns to step S20 and continues the processing.

On the other hand, the sensor controller 31 when determining in step S31 that the pen 2 is not hovering performs the processing of steps S32 to S35. Incidentally, step S31 does not have to be performed. It suffices for the sensor controller 31 in this case to perform the processing of steps S32 to S35 according to the determination in step S30 that the reception timing for the rear end electrode 22 has not arrived.

Step S32 is processing corresponding to step S6 in FIG. 3. In step S32, the sensor controller 31 performs the second scan, and obtains the signal levels of the position signals at the respective reference positions as a result of the second scan. Step S33 is processing corresponding to step S7 in FIG. 3. In step S33, the sensor controller 31 derives coordinates indicating the position of the rear end electrode 22 on the basis of the signal levels obtained in step S32. Steps S34 and S35 are processing corresponding to step S8 in FIG. 3. The sensor controller 31 derives the tilt of the pen 2 on the basis of the coordinates of the front end electrode 21 which are derived in step S24 and the coordinates of the rear end electrode 22 which are derived in step S33 (step S34) and outputs the tilt of the pen 2 to the host processor 32 (step S35).

As described above, according to the touch pad 12 according to the present embodiment, while the detection of the coordinates of the front end electrode 21 in contact is realized with high accuracy by making the pitch P of the sensor electrodes 30X and 30Y smaller than the conventional pitch, the position signal transmitted from the rear end electrode 22 or the front end electrode 21 during hovering can be scanned in a greater range than the position signal transmitted from the front end electrode 21 in contact. Hence, the position signal from the rear end electrode 22 or the front end electrode 21 during hovering, which tends to spread on the panel surface 12a, can be captured in a greater range. It is therefore possible to achieve both an improvement in accuracy of detection of the coordinates of the front end electrode 21 in contact and an improvement in accuracy of detection of the coordinates of the rear end electrode 22 or the front end electrode 21 during hovering.

In the following, effects produced by the present disclosure will be described in detail with reference to FIGS. 9 to 12.

Figure 9A:
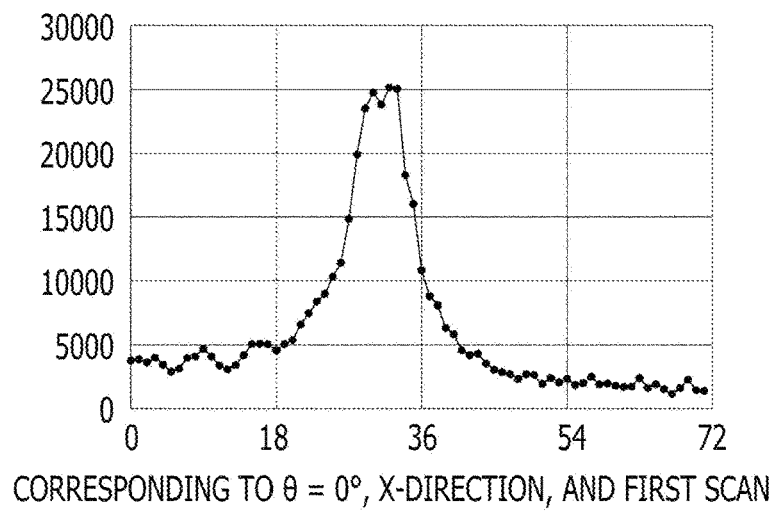
FIGS. 9A, 9B, and 9C are diagrams depicting measurement results of signal levels of a position signal transmitted from a rear end electrode at respective reference positions in an X-direction in a case where an tilt θ of the pen is 0°.
Figure 9B:
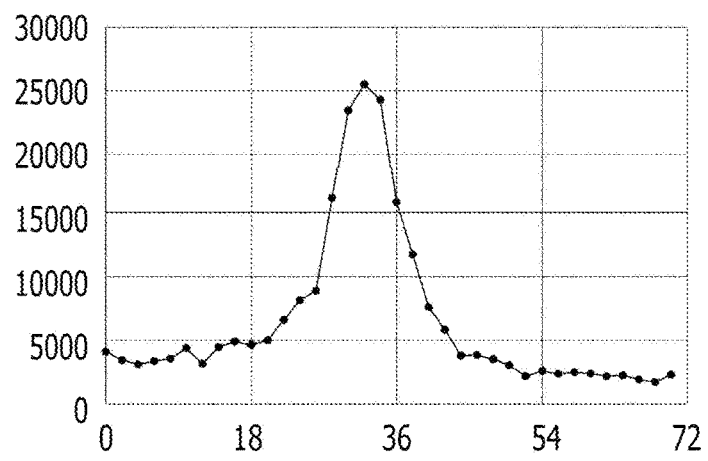
Figure 9C:
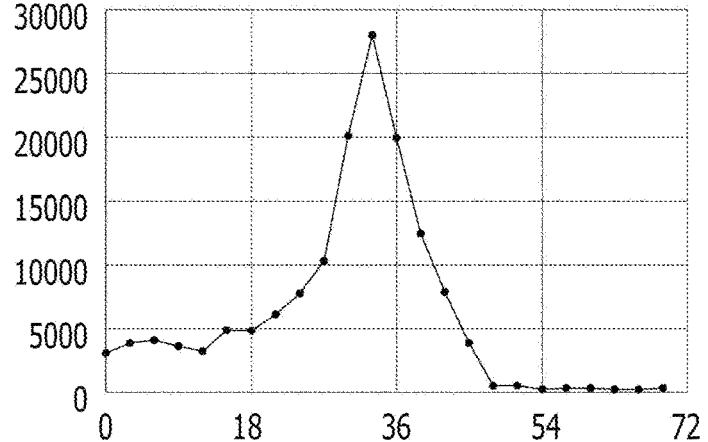
Figure 10A:
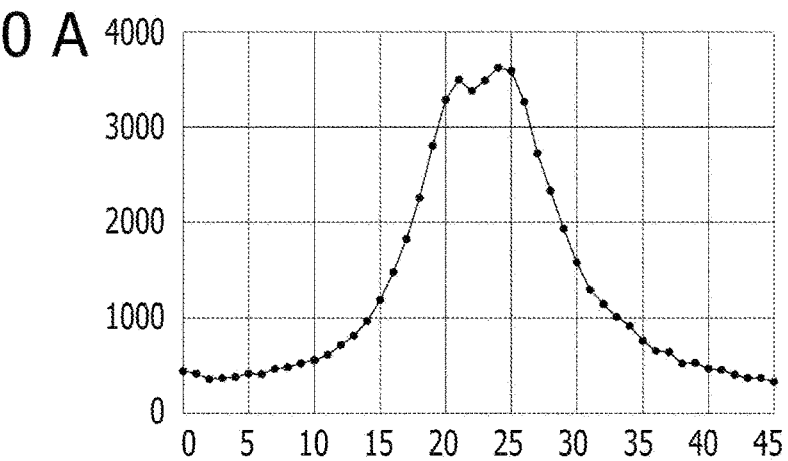
FIGS. 10A, 10B, and 10C are diagrams depicting measurement results of signal levels of the position signals transmitted from the rear end electrode at respective reference positions in a Y-direction in a case where the tilt θ of the pen is 0°.
Figure 10B:
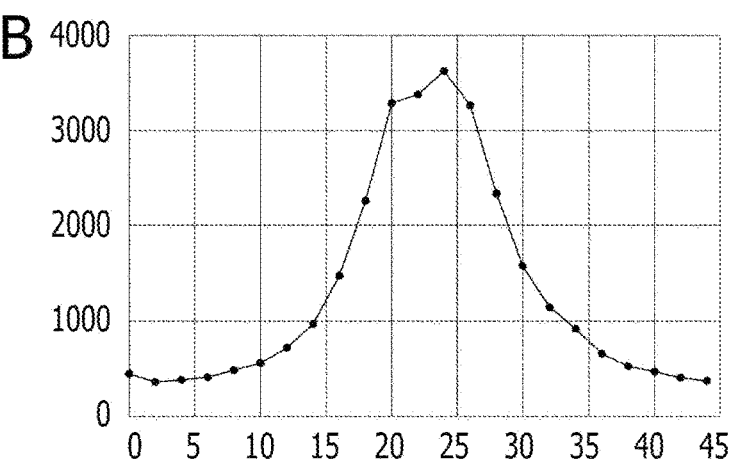
Figure 10C:
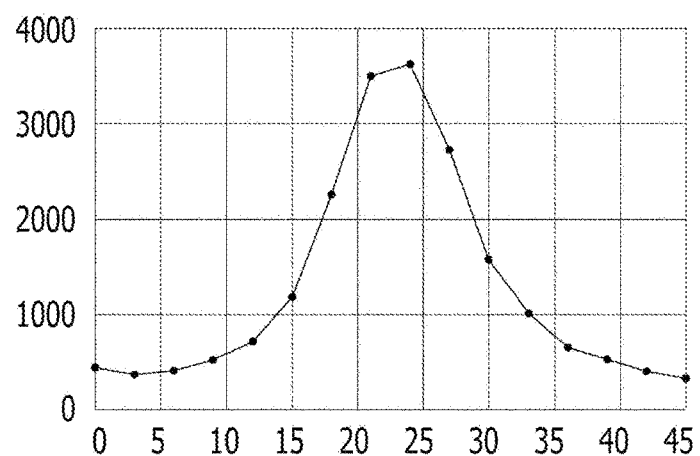
Figure 11A:
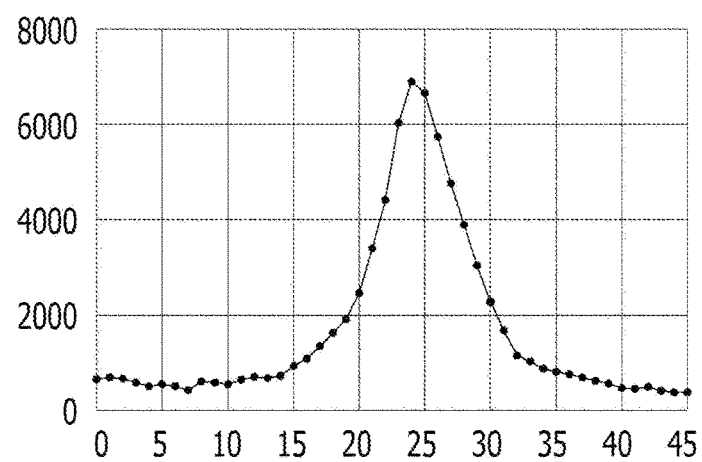
FIGS. 11A, 11B, and 11C are diagrams depicting measurement results of signal levels of the position signals transmitted from the rear end electrode at respective reference positions in the Y-direction in a case where the tilt θ of the pen is 30°.
Figure 11B:
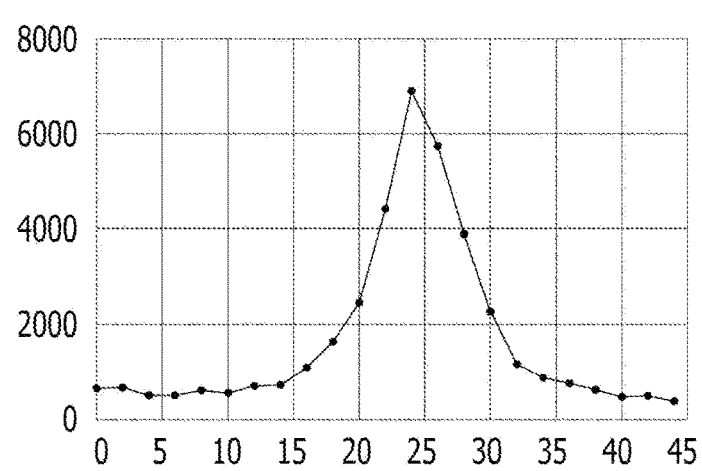
Figure 11C:
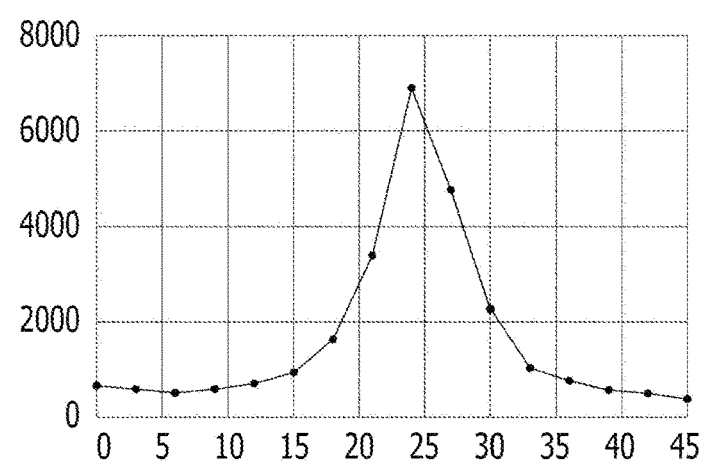

FIGS. 9A to 9C, FIGS. 10A to 10C, and FIGS. 11A to 11C are each a diagram depicting measurement results of signal levels of the position signals transmitted from the rear end electrode 22 at respective reference positions. In these figures, an axis of ordinates represents signal levels. In addition, an axis of abscissas represents reference positions in the X-direction in FIGS. 9A to 9C, while an axis of abscissas represents reference positions in the Y-direction in FIGS. 10A to 10C and FIGS. 11A to 11C. In addition, FIGS. 9A to 9C and FIGS. 10A to 10C represent a case where the tilt $\theta$ of the pen 2 (an angle formed between the pen axis of the pen 2 and a normal to the panel surface 12a) is 0° (that is, a case where the pen 2 stands perpendicularly to the panel surface 12a), while FIGS. 11A to 11C represent a case where $\theta$ is 30°. Further, FIG. 9A, FIG. 10A, and FIG. 11A depict signal levels at all of reference positions. FIG. 9B, FIG. 10B, and FIG. 11B depict signal levels at reference positions selected as every other reference position, and FIG. 9C, FIG. 10C, and FIG. 11C depict signal levels at reference positions selected as every third reference position.

Referring first to FIG. 9A and FIG. 10A, it is understood that, in the case of $\theta=0°$, an upper end of a curve represented by the signal levels at the respective reference positions is flat, and therefore the coordinates of the rear end electrode 22 cannot be derived correctly even when three reference positions are selected from the center of the upper end of the curve and approximated by a least-square method. Causes of the flat upper end of the curve as in FIG. 9A and FIG. 10A may include non-contact of the rear end electrode 22 with the panel surface 12a as well as the presence of the front end electrode 21 between the rear end electrode 22 and the panel surface 12a.

Referring next to FIG. 9B and FIG. 10B, it is understood that a flat part at the upper end of the curve is slightly reduced by thinning out the reference positions to a half. In this state, however, the reduction of the flat part is not sufficient yet, and the coordinates of the rear end electrode 22 cannot necessarily be derived correctly.

Referring next to FIG. 9C and FIG. 10C, it is understood that the flat part at the upper end of the curve is further reduced by thinning out the reference positions to a third. In this state, it can be said that the flat part is reduced sufficiently, and the coordinates of the rear end electrode 22 can be derived correctly. Hence, it can be said that the coordinates of the rear end electrode 22 can be derived correctly by configuring the sensor controller 31 to select every third reference position in the case of $\theta=0°$ as in the examples depicted in FIG. 5C, FIG. 6C, and FIG. 7C.

On the other hand, referring to FIGS. 11A to 11C, it is understood that, in the case of $\theta=30°$, even in the state of FIG. 11A in which the reference positions are not thinned out, the upper end of the curve represented by the signal levels of the respective reference positions is sufficiently protruded upward, and therefore the coordinates of the rear end electrode 22 can be derived correctly. In addition, as is clear from FIG. 11B and FIG. 11C, it is understood that the coordinates of the rear end electrode 22 can be similarly derived correctly also when the reference positions are thinned out. While FIGS. 11A to 11C depict only measurement results at the respective reference positions in the Y-direction, the same is true for measurement results at the respective reference positions in the X-direction.

As is understood from the measurement results in FIGS. 9A to 9C, FIGS. 10A to 10C, and FIGS. 11A to 11C, the accuracy of detection of the coordinates of the electrode not in contact with the panel surface tends to be degraded as the tilt $\theta$ is decreased and made smaller. Hence, it can be said that the smaller the tilt $\theta$, the obtained effect of improvement in coordinate detection accuracy becomes more noticeable according to the present disclosure. Though not depicted, in a case of $\theta=10°$ situated between $\theta=0°$ and $\theta=30°$ described above, for example, the coordinates of the rear end electrode 22 can be derived sufficiently correctly by thinning out the reference positions to a half.

Figure 12A:
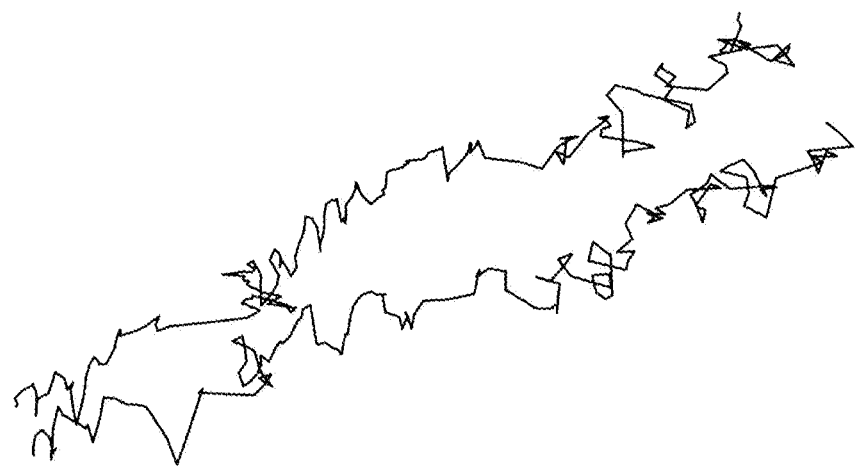
FIG. 12A is a diagram depicting the trajectory (trace) of the position of the rear end electrode in a case where the tip end of the pen is slid while tilt θ=0° is maintained on a panel surface in a comparative example in which the present disclosure is not applied.
Figure 12B:
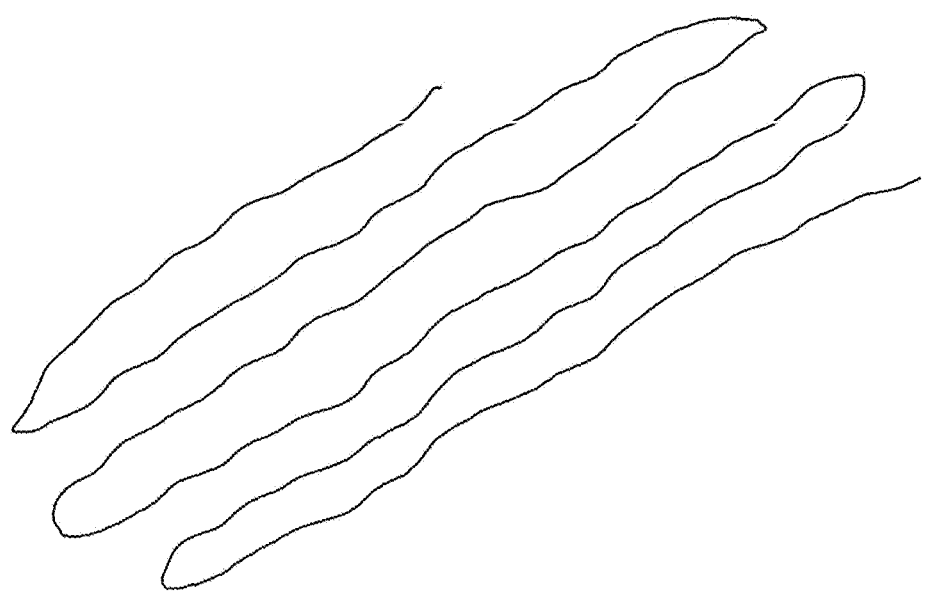
FIG. 12B is a diagram depicting the trajectory (trace) of the position of the rear end electrode in a case where the tip end of the pen is slid while tilt θ=0° is maintained on the panel surface in an example in which the present disclosure is applied.

FIG. 12A and FIG. 12B are each a diagram depicting the trajectory (the trace) of the position of the rear end electrode 22 in a case where the tip end of the pen 2 is slid while $\theta=0°$ is maintained on the panel surface 12a. FIG. 12A illustrates a comparative example in which the present disclosure is not applied. FIG. 12B illustrates an example in which the present disclosure is applied. In the example of FIG. 12B, the sensor controller 31 is configured to select every third reference position in the second scan.

As is understood from FIG. 12A, in the comparative example in which the present disclosure is not applied, large jitter appears in the trace of the position of the rear end electrode 22. This indicates that the upper end of the curve represented by the signal levels at the respective reference positions is flat as in the example depicted in FIG. 9A, and that the position of the vertex of the approximate curve (quadratic function) obtained by the least-square method is unstable.

On the other hand, in the example in which the present disclosure is applied, as is understood from FIG. 12B, jitter is hardly observed. From this result, it is understood that the present disclosure can improve the accuracy of detection of the coordinates detected on the basis of the position signal transmitted from the rear end electrode 22.

Preferred embodiments of the present disclosure have been described above. However, the present disclosure is not at all limited to these embodiments, and the present disclosure can be carried out in various modes without departing from the scope of the present disclosure.

FIG. 13 is a processing flowchart depicting reception processing of the downlink signal DS performed by a sensor controller 31 according to a modification of the foregoing embodiments at a time of a local scan. The sensor controller 31 according to the present modification is configured to make a selection as to which of the first scan and the second scan to perform on the basis of a previous signal level detection result for each electrode of the pen 2. In the following, description will be made in detail with reference to FIG. 13.

The sensor controller 31 according to the present modification first sets a transition flag false (False), wherein the transition flag is a Boolean variable provided for each electrode of the pen 2 (step S40). The sensor controller 31 next performs the processing of steps S42 to S51 for each electrode of the pen 2 (step S41).

Specifically, the sensor controller 31 first determines whether or not reception timing for an electrode of interest has arrived (step S42). Then, when the sensor controller 31 determines that the reception timing for the electrode of interest has not arrived, the sensor controller 31 moves the processing to the next electrode. When the sensor controller 31 determines that the reception timing for the electrode of interest has arrived, on the other hand, the sensor controller 31 determines the value of the transition flag of the electrode of interest (step S43). When the sensor controller 31 determines as a result that the value of the transition flag is false (False), the sensor controller 31 performs the first scan (step S44). When the sensor controller 31 determines that the value of the transition flag is true (True), the sensor controller 31 performs the second scan (step S47). Concrete contents of the first scan and the second scan are as described with reference to FIGS. 4A and 4B.

The sensor controller 31 after performing the first scan in step S44 determines whether or not a difference between a maximum signal level (peak level) among the detected signal levels and another signal level is equal to or less than a predetermined value (step S45). Then, the sensor controller 31 sets the transition flag of the electrode of interest true (True) only when the sensor controller 31 determines that the difference is equal to or less than the predetermined value. The sensor controller 31 thereafter moves the processing to step S48.

The sensor controller 31 after performing the second scan in step S47 or after ending the processing of steps S45 and S46 derives coordinates indicating the position of the electrode of interest on the basis of the signal levels detected in step S44 or step S47 (step S48). A concrete method of this derivation may be similar to that of step S4 or S7 in FIG. 3 or the like. After step S48, the sensor controller 31 performs other processing (step S49). Though concrete contents of the other processing differ according to the kind of the electrode of interest, the concrete contents of the other processing may be, for example, the processing of steps S25 and S26 or steps S34 and S35 depicted in FIG. 8.

The sensor controller 31 next determines the value of the transition flag of the electrode of interest again (step S50). When the sensor controller 31 determines as a result that the value of the transition flag is false (False), the sensor controller 31 moves the processing to the next electrode. When the sensor controller 31 determines that the value of the transition flag is true (True), on the other hand, the sensor controller 31 determines whether or not a factor (a "return factor") that returns the transition flag of the electrode of interest to a false state (False) has occurred (step S51). This return factor may be a fact that the value of the pen pressure received from the pen 2 has become a value larger than zero (that is, the front end electrode 21 is brought into contact) in a case where the electrode of interest is the front end electrode 21, for example, or may be a fact that the derived tilt θ of the pen 2 has become equal to or more than a predetermined value in a case where the electrode of interest is the rear end electrode 22, for example. The sensor controller 31 sets the transition flag of the electrode of interest false (False) only when the sensor controller 31 determines in step S51 that the return factor has occurred. The sensor controller 31 then moves the processing to the next electrode.

As described above, the touch pad 12 according to the present modification can change a scanning method from the first scan to the second scan for an electrode whose difference between the peak level and another signal level is equal to or less than the predetermined value. Hence, the position signal transmitted from the electrode causing the upper end of the curve represented by the signal levels of the respective reference positions to be flat can be captured in a wider range. Thus, the touch pad 12 according to the present modification can achieve both an improvement in accuracy of detection of the coordinates of the electrode in contact with the panel surface 12a and an improvement in accuracy of detection of the coordinates of the electrode not in contact with the panel surface 12a.

While the example has been described in which the scanning method for the electrode whose difference between the peak level and another signal level is equal to or less than the predetermined value is changed between the first scan and the second scan in the foregoing modification, the scanning method for a specific electrode may be changed between the first scan and the second scan in another manner. For example, the scanning method for the rear end electrode 22 may be changed from the first scan to the second scan when the value of the previously detected tilt θ becomes equal to or less than a predetermined value.

The invention claimed is:

1. A method performed by a sensor controller for detecting coordinates of a pen on a panel surface of a touch sensor including a plurality of reference positions arranged at equal intervals along a first direction, each of the plurality of reference positions associated with one or more sensor electrodes, the pen including one or more pen electrodes, the method comprising:

a first scanning step of detecting a first signal transmitted from a pen electrode in contact with the panel surface, among the one or more pen electrodes, by selecting a first group of sensor electrodes of the touch sensor included in a first range along the first direction, the first group of sensor electrodes located at three or more first reference positions among the plurality of reference positions, wherein the first group of sensor electrodes located at the three or more first reference positions have a first electrode position density per unit of length along the first direction;

a second scanning step of detecting a second signal transmitted from a pen electrode not in contact with the panel surface, among the one or more pen electrodes, by selecting a second group of sensor electrodes of the touch sensor included in a second range along the first direction, the second group of sensor electrodes located at three or more second reference positions different from the three or more first reference positions, wherein the second group of sensor electrodes located at the three or more second reference positions have a second electrode position density per the unit of length along the first direction, and the second electrode position density is less than the first electrode position density, wherein the second range is greater than the first range;

a first deriving step of deriving a coordinate on a basis of signal levels detected at the three or more first reference positions in the first scanning step; and a second deriving step of deriving a coordinate on a basis of signal levels detected at the three or more second reference positions in the second scanning step.

2. The method according to claim 1, wherein the pen electrode in contact with the panel surface is a front end electrode arranged near a front end of the pen, the pen electrode not in contact with the panel surface is a rear end electrode arranged near a rear end of the pen, and the sensor controller performs the first scanning step to detect the first signal transmitted from the front end electrode and the second scanning step to detect the second signal transmitted from the rear end electrode on a time-division basis, according to a schedule determined by a signal transmission and reception protocol.

3. The method according to claim 1, wherein the pen electrode in contact with the panel surface and the pen electrode not in contact with the panel surface are both a front end electrode arranged near a front end of the pen, the sensor controller performs the first scanning step when data included in a signal received from the pen indicates that the front end electrode is in contact with the panel surface, and the sensor controller performs the second scanning step when the data included in the signal received from the pen indicates that the front end electrode is not in contact with the panel surface.

4. The method according to claim 1, wherein the sensor controller starts the second scanning step when a difference between a peak level and another signal level among the signal levels detected at the three or more first reference positions in the first scanning step is equal to or less than a predetermined value.

5. The method according to claim 1, wherein a span of the three or more second reference positions is greater than a span of the three or more first reference positions.

6. The method according to claim 5, wherein the three or more first reference positions are arranged consecutively among the plurality of reference positions, and the three or more second reference positions are arranged non-consecutively among the plurality of reference positions.

7. The method according to claim 6, wherein the three or more second reference positions are each arranged at an interval of a defined number of reference positions among the plurality of reference positions.

8. The method according to claim 7, wherein the second scanning step is configured to select, as the three or more second reference positions, a reference position closest to the coordinate derived in the first deriving step and two or more reference positions each arranged at the interval of the defined number of reference positions from the selected reference position.

9. The method according to claim 1, wherein the signal levels at the three or more second reference positions are detected by statistically processing signal levels detected in the second group of sensor electrodes.

10. A sensor controller for detecting coordinates of a pen on a panel surface of a touch sensor including a plurality of reference positions arranged at equal intervals along a first direction, each of the plurality of reference positions associated with one or more sensor electrodes, the pen including one or more pen electrodes, the sensor controller comprising circuitry configured to perform:

a first scanning step of detecting a first signal transmitted from a pen electrode in contact with the panel surface, among the one or more pen electrodes, by selecting a first group of sensor electrodes of the touch sensor included in a first range along the first direction, the first group of sensor electrodes located at three or more first reference positions among the plurality of reference positions, wherein the first group of sensor electrodes located at the three or more first reference positions have a first electrode position density per unit of length along the first direction;

a second scanning step of detecting a second signal transmitted from a pen electrode not in contact with the panel surface, among the one or more pen electrodes, by selecting a second group of sensor electrodes of the touch sensor included in a second range along the first direction, the second group of sensor electrodes located at three or more second reference positions different from the three or more first reference positions, wherein the second group of sensor electrodes located at the three or more second reference positions have a second electrode position density per the unit of length along the first direction, and the second electrode position density is less than the first electrode position density, wherein the second range is greater than the first range;

a first deriving step of deriving a coordinate on a basis of signal levels detected at the three or more first reference positions in the first scanning step; and a second deriving step of deriving a coordinate on a basis of signal levels detected at the three or more second reference positions in the second scanning step.

11. An electronic apparatus comprising:

a pen including one or more pen electrodes; and a sensor controller configured to detect coordinates of the pen on a panel surface of a touch sensor including a plurality of reference positions arranged at equal intervals along a first direction, each of the plurality of reference positions associated with one or more sensor electrodes, the sensor controller being configured to perform:

a first scanning step of detecting a first signal transmitted from a pen electrode in contact with the panel surface, among the one or more pen electrodes, by selecting a first group of sensor electrodes of the touch sensor included in a first range along the first direction, the first group of sensor electrodes located at three or more first reference positions among the plurality of reference positions, wherein the first group of sensor electrodes located at the three or more first reference positions have a first electrode position density per unit of length along the first direction, a second scanning step of detecting a second signal transmitted from a pen electrode not in contact with the panel surface, among the one or more pen electrodes, by selecting a second group of sensor electrodes of the touch sensor included in a second range along the first direction, the second group of sensor electrodes located at three or more second reference positions different form the three or more first reference positions, wherein the second group of sensor electrodes located at the three or more second reference positions have a second electrode position density per the unit of length along the first direction, and the second electrode position density is less than the first electrode position density, wherein the second range is greater than the first range, a first deriving step of deriving a coordinate on a basis of signal levels detected at the three or more first reference positions in the first scanning step, and a second deriving step of deriving a coordinate on a basis of signal levels detected at the three or more second reference positions in the second scanning step.

\* \* \* \* \*